Figure 1:
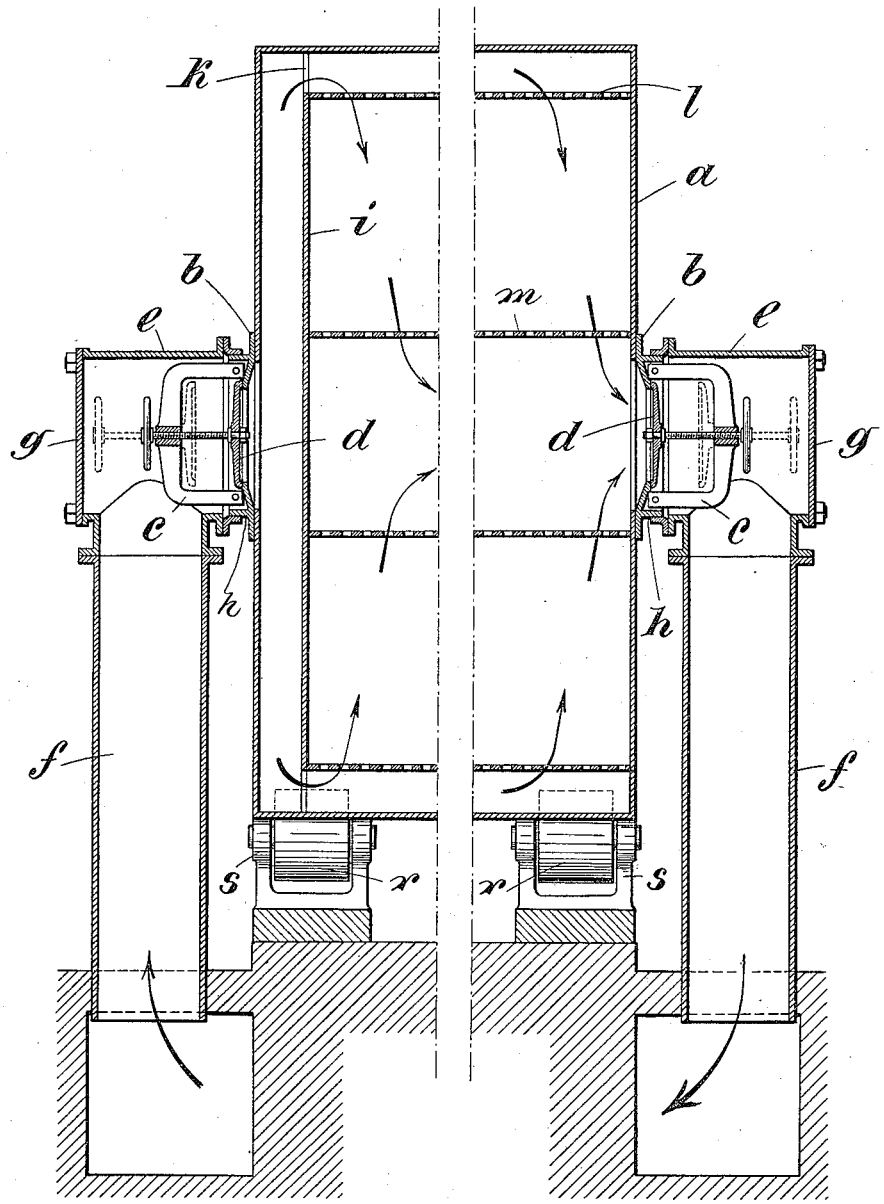

F. KNÜTTEL.
MALT DRUM.
APPLICATION FILED AUG. 20, 1912.

1,064,490.

Patented June 10, 1913.
2 SHEETS—SHEET 1.

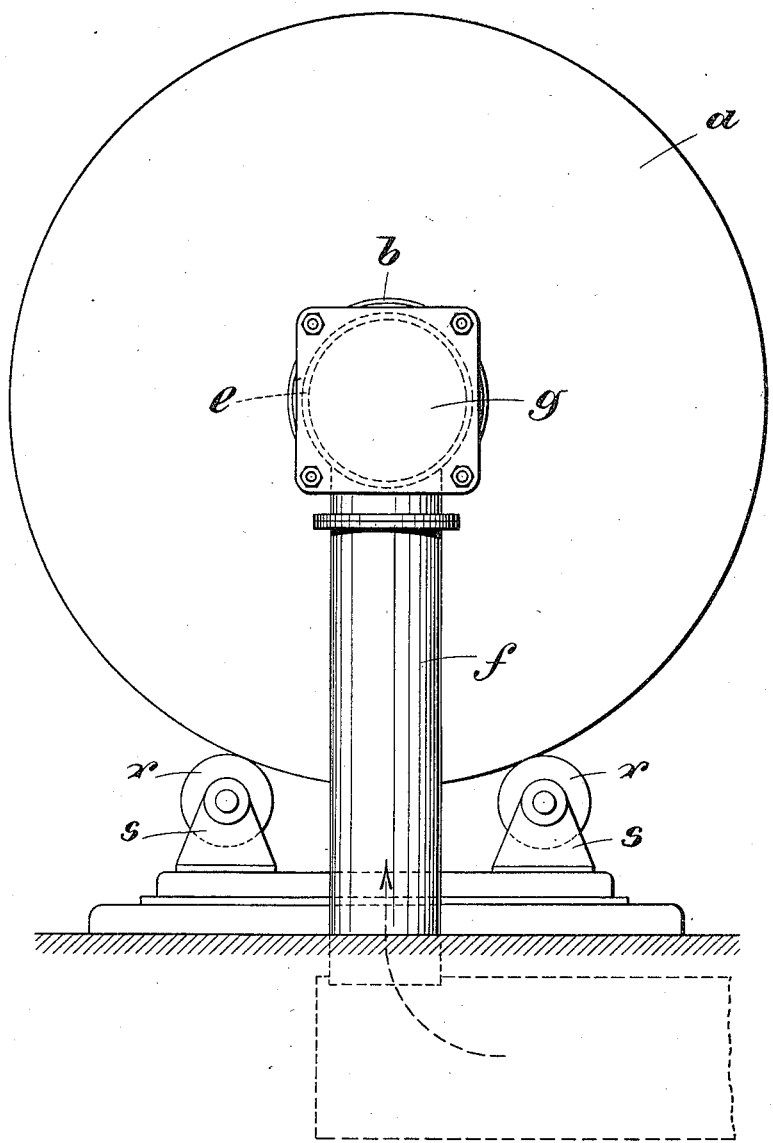

UNITED STATES PATENT OFFICE.

FRIEDRICH KNÜTTEL, OF CHARLOTTENBURG, GERMANY.

MALT-DRUM.

1,064,490.

Specification of Letters Patent.  Patented June 10, 1913.

Application filed August 20, 1912. Serial No. 716,000.

*To all whom it may concern:*

Be it known that I, FRIEDRICH KNÜTTEL, of Charlottenburg, Germany, a subject of the King of Prussia, and whose post-office address is No. 6 Franklinstrasse, Charlottenburg, near Berlin, Kingdom of Prussia, Germany, have invented new and useful Improvements in and Relating to Malt-Drums, of which the following is a specification.

This invention relates to malting drums which are rotatably mounted in the known manner at their circumference on supporting rollers and provided with air pipes in order to aerate the malt in the drum. In drums for germinating malt it is a well known expedient to insert in the air pipes means such as throttling valves, for regulating the quantity of air passing through the malt to be aerated. As shown by experiments, it is however of the greatest importance to shut off the air completely from the germinating malt for long periods, during which the malt becomes slowly heated. It can be aerated again for the purpose of cooling after a long time. In known drums, it was not possible to do this because even when the throttling valves were closed, there was still a slight ventilation, as it was impossible to shut off the drums in an air-tight manner from the ventilating piping and the atmospheric air by means of such valves. Consequently, there was an energetic absorption of oxygen, and therefore an excessive and quick heating of the malt. The malt had therefore to be thoroughly ventilated at short intervals, which had the drawback of a strong aeration in the interior of the malt grains, with the consequent loss of the contents of malt (malt shrinkage).

This invention has for its object to remove the drawbacks in question, and improves the malt drum by using a closing device whereby it is possible temporarily to insure an absolutely air-tight closure of the drum interior against the atmospheric air and air pipes, in spite of the drum making movements, during its rotation on the supporting rollers, in the axial as well as in the radial direction.

A construction of a drum with the new closing device is illustrated by way of example in the accompanying drawing in which—

Figure 1 is a longitudinal section through the center of the drum, with the central part of the drum broken off, and Fig. 2 is an end elevation of the drum.

In the drawing, $a$ is a non-perforated drum casing which is rotatably supported on rollers $r$ mounted in bearings $s$, so that the drum can be rotated in the known manner by means of any suitable outside driving device, during the aeration and the treatment of the malt in the drum. In the center of the interior of the drum is arranged a perforated tube $m$ on a partition $i$. On the circumference of the partition $i$ are provided conduits or pockets $k$ which admit air through the perforated casing $l$ into the space in the interior of the drum between said casing $l$ and the perforated central tube $m$. In the said space the malt is disposed. The air for aerating the malt is supplied and discharged through fixed pipes $f$ terminating in cylindrical chambers $e$ which form at $h$ tight joints with the central flange rings $b$ of the drum. These tight joints are not however absolutely air-tight, owing to the mobility of the drum in the axial and radial direction during its rotation on the supporting rollers $r$, so that it would have been impossible to close periodically the interior of the drum in a perfectly air tight manner from the outside and from the air pipes $f$ by means of the said tight joints between the rotating drum casing and the fixed air chamber, as would be desirable. In order to make such tight closing possible, the flange rings $b$ are formed into seats for disk valves $d$, the spindles of which are arranged in the axial direction of the drum and are mounted in brackets $c$ secured to the flange rings $b$ rotating with the drum. The disk valves $d$ are caused to form a tight joint with their seats $b$, either by grinding or by means of a rubber packing or the like, and as the said closing valves rotate with the drum, no air can get into the interior of the drum either from the outside or from the air pipes, when the valves are closed. The disk valves $d$ are rendered accessible by means of detachable covers $g$. When malt is to be aerated, the disk valves are opened by means of a hand wheel or the like mounted on their spindle, the amount of aeration being at the same time regulated by the size of the opening. If on the contrary the interior of the drum with the malt is to be temporarily closed in an air-tight manner, the disk valves $d$ are completely closed, in which case no outer air can enter the interior of the drum through leaky portions in the outer joint $h$ during the rotation of the drum.

What I do claim as my invention, and desire to secure by Letters Patent of the United States, is:—

1. In a malting drum, the combination of rollers, a non-perforated drum casing rotatably and circumferentially mounted on said rollers, said drum casing having axial openings, a perforated central tube, stationary pipes for supplying and discharging air, valve seats arranged on said axial openings of the drum casing, valve disks mounted movably on the said seats and means for closing the valve disks air-tight, substantially as set forth.

2. In a malting drum, the combination of rollers, a non-perforated drum casing rotatably and circumferentially mounted on said rollers, said drum casing having axial openings, a perforated central tube, a partition, a perforated casing within the drum casing, stationary pipes for supplying and discharging air, valve seats arranged on said axial openings of the drum casing within chambers of the said stationary pipes, brackets secured to said seats, valve disks mounted movably on said brackets, and means for closing and opening the chambers of the stationary pipes, substantially as set forth.

In testimony whereof I have hereunto set my hand in presence of two subscribing witnesses.

FRIEDRICH KNÜTTEL.

Witnesses:
 HENRY HASPER,
 ARTHUR SCHROEDER.

---

Copies of this patent may be obtained for five cents each, by addressing the "Commissioner of Patents, Washington, D. C."